Nov. 6, 1934.    G. A. BRUCE ET AL    1,979,528
ARC WELDING METAL ELECTRODE FRAGMENT HOLDER
Filed May 8, 1933
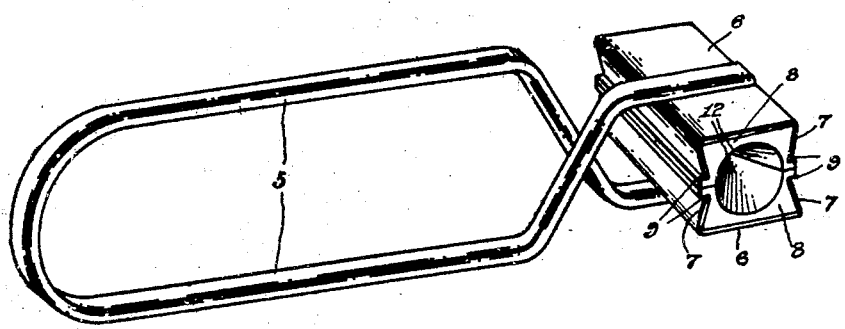
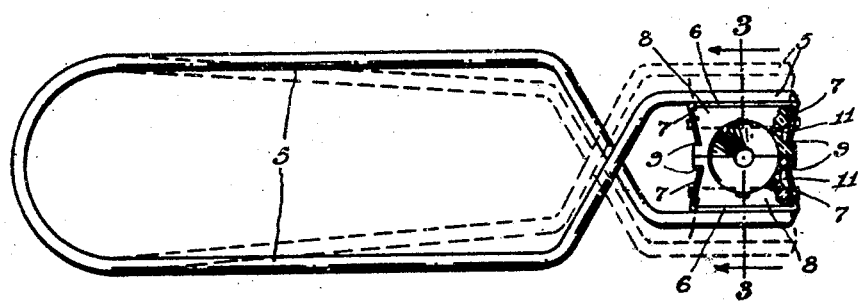
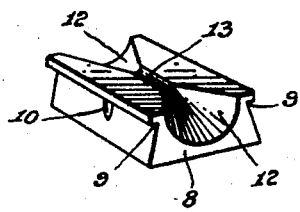
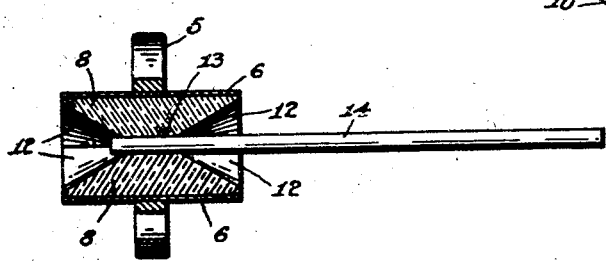
Inventors
George A. Bruce
and Arthur A. Mace
By John W. Maupin
Attorney Patented Nov. 6, 1934

1,979,528

UNITED STATES PATENT OFFICE 1,979,528

ARC WELDING METAL ELECTRODE FRAGMENT HOLDER

George A. Bruce, Renton, and Arthur A. Mace, Foster, Wash.

Application May 8, 1933, Serial No. 669,893

1 Claim. (Cl. 219—8)

Our invention relates to arc welding metal electrode fragment holders and the principal objects of the invention are to provide a holder having high heat resisting jaws, that are non-conductors of electric current, wherewith the fragmental ends of the metal electrode wires that are used in arc welding are held and welded to an end of a new or unused electrode wire thereby saving the fragmental ends which have heretofore been thrown away. These fragmental wire ends, that are left in the main electrode holder when welding and which are saved by our device and method, average from two or three to six or eight inches in length, and as the new or unused electrode wires are approximately fourteen inches long it is apparent that we effect a saving of about twenty-eight percent of this costly welding material. Another important object of the invention is to provide the ends of the two non-conductor jaws with complementary semi-conical recesses which recesses serve as guides when placing the ends of the unused wire electrodes against the ends of the fragments when the two wires are welded together.

With the above and other objects in view which will appear as the description proceeds, the invention consists of the novel construction, adaptation, combination and arrangement of parts hereinafter described and claimed. These objects are accomplished by devices illustrated in the accompanying drawing; wherein: Figure 1 is a view in perspective of the holder; Fig. 2 is a view in side elevation of the same with parts of the jaws broken away to show the securing means; Fig. 3 is a view in transverse vertical section taken on a broken line 3—3 of Fig. 2; and Fig. 4 is a detail view in perspective showing one of the heat resisting non-conductor jaws.

Referring in detail to the drawing throughout which like reference numerals indicate like parts, the numeral 5 designates the handle of the holder which is made of a single length of spring metal bent upon itself to form two spaced apart arms whose free end portions are crossed in the form of the letter X and extended outwardly in parallel spaced apart relation. The clamping elements of our device comprise two jaw casings 6 which have their backs fixed to the two open inside end portions of the handle by any suitable means. Said two casings are identical in construction and their side flanges 7 converge or slant inwardly. The two jaw members 8 are also identical in shape and their sides slant inwardly in conformity with the side flanges of the casings and form grooves 9 which receive the edges of the casing flanges when the jaw members are slipped into the casings. A side of each of the jaw members is provided with a small depression or recess 10 which receives a corresponding indentation or boss 11 that is pressed inwardly from a side of the casing flanges. The jaw members are thus retained securely in place and may be removed for renewal whenever necessary.

The engaging faces of the two jaw members 8 are provided with semi-conical recesses 12 at each of their ends and a central semi-annular groove 13 forms a connecting channel between said recesses. Said recesses and grooves are complementary and form end conical recesses connected by an annular groove when the jaws are clamped together as will be understood. It will be understood that the tension of the spring handle 5 retains the jaws together and to open the jaws it is only necessary to press the two arms of the handle inwardly as shown in dotted lines in Fig. 2 of the drawing. Any suitable non-conductor material may be used for the jaw members that is tough and of high heat resistance, such as porcelain, solidified asbestos or the like.

In describing the use of our device we may assume that a wire electrode, which is originally about fourteen inches in length, has been mostly consumed in arc welding and that a piece several inches long is left in the grasp of the main electrode holder. As hereinbefore stated, it has been customary to throw away this short piece of the electrode wire which practice has resulted in considerable loss. Instead of throwing this short piece away, which piece is designated by the numeral 14, same is grasped between the grooves 13 of our device, with one of its ends projecting slightly into the semi-conical recesses 12 at either end of the jaws 8 as clearly shown in Fig. 3. The main electrode holder (not shown) is then released from the fragment 14 and a new electrode is placed in said holder. The electrode fragment is then grounded on the work by means of one hand grasping the handle 5 of our device, and the other hand is used on the main holder to place the new electrode against the grasped end of the electrode fragment. It will be understood that the main holder carries the electric wire, and, immediately upon placing the new electrode against the grounded fragment the current will flow through both thus heating same and causing a metal arc to form at the joint whereby the wires are welded together.

Our device is quick and convenient in use and may be carried on a belt worn by the workman where it is always handy and ready for use. To grasp an electrode fragment it is merely necessary to press the handle, insert an end of the fragment between the jaws, and release the handle. The device is reversible and the fragment may be inserted in either end of the jaws and project into the conical recesses in either end thereof. The conical recesses serve as guides for inserting the ends of electrodes and are especially useful in guiding the end of a new wire into abutment with the projecting end of the fragment when same is positioned as shown in Fig. 3 of the drawing. If desired only one end of the jaw members may be conically recessed.

Having thus described our invention, it being understood that minor changes in its construction and arrangement may be resorted to without departing from the scope and spirit of the invention, what we claim and desire to secure by Letters Patent of the United States is:—

An arc welding metal electrode holder comprising a spring metal handle that is bent upon itself to form parallel arms and crossed to form outwardly extending spaced apart end portions, a pair of opposing jaw casings fixed transversely to said end portions and having inwardly slanting side flanges, a pair of non-conductor heat resisting jaws each having inwardly slanting sides corresponding to the slanting side flanges of the jaw casings, said jaws slidably and detachably mounted in said casings and normally held one against the other by the spring handle, means for retaining the jaws within the casings, both ends of each jaw having large complementary semi-conical recesses extending into the jaws, and said jaws having small complementary grooves connecting the semi-conical end recesses.

GEORGE A. BRUCE.
ARTHUR A. MACE.